(12) United States Patent
Kothari et al.

(10) Patent No.: US 11,969,949 B2
(45) Date of Patent: Apr. 30, 2024

(54) CUSTOM THREE-DIMENSIONAL (3D) PRINT MODE GENERATION

(71) Applicant: Hewlett-Packard Development Company, L.P., Spring, TX (US)

(72) Inventors: Sunil Kothari, Palo Alto, CA (US); Kelly Ronk, Corvallis, OR (US); Anthony Powell, Vancouver, WA (US); Jun Zeng, Palo Alto, CA (US); Md Abdullah Al Hafiz Khan, Baltimore, MD (US); Tod Heiles, Sumner, WA (US); Goffril Obegi, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 367 days.

(21) Appl. No.: 17/420,074

(22) PCT Filed: Jan. 10, 2019

(86) PCT No.: PCT/US2019/013081
§ 371 (c)(1),
(2) Date: Jun. 30, 2021

(87) PCT Pub. No.: WO2020/145982
PCT Pub. Date: Jul. 16, 2020

(65) Prior Publication Data
US 2022/0080672 A1    Mar. 17, 2022

(51) Int. Cl.
*B29C 64/393* (2017.01)
*B29C 64/379* (2017.01)
(Continued)

(52) U.S. Cl.
CPC .......... *B29C 64/393* (2017.08); *B29C 64/379* (2017.08); *B33Y 30/00* (2014.12);
(Continued)

(58) Field of Classification Search
CPC ..... B29C 64/393; B29C 64/379; B33Y 30/00; B33Y 50/02; G06T 7/0004;
(Continued)

(56) References Cited

U.S. PATENT DOCUMENTS 5,218,529 A    6/1993    Meyer
9,999,924 B2   6/2018    Dave
(Continued)

*Primary Examiner* — Isiaka O Akanbi
(74) *Attorney, Agent, or Firm* — Shook, Hardy & Bacon L.L.P.

(57) ABSTRACT

A method of custom print mode generation in a three-dimensional (3D) printing device may include printing a plurality of parts with a plurality of 3D printing devices, the parts each being printed using different process parameters, and capturing a plurality of images of the parts. The method may also include, with an image analysis module, analyzing the images to classify the parts into a plurality of defect gradings, and adjusting a number of the process parameters based on characteristics of the parts identified by a user as undesirable. The examiner may also include, with a recommending module, creating a custom print mode based on the parts defect gradings and adjusted process parameters.

15 Claims, 8 Drawing Sheets

(51) Int. Cl.
  *B33Y 30/00* (2015.01)
  *B33Y 50/02* (2015.01)
  *G06T 7/00* (2017.01)
(52) U.S. Cl.
  CPC ............ *B33Y 50/02* (2014.12); *G06T 7/0004* (2013.01); *G06T 2207/20084* (2013.01); *G06T 2207/30164* (2013.01)
(58) Field of Classification Search
  CPC ........... G06T 2207/20084; G06T 2207/30164; G05B 2219/49023; G05B 19/4099
  USPC .......................... 356/614–624; 382/141, 144
  See application file for complete search history.

(56) References Cited

U.S. PATENT DOCUMENTS

| | | |
|---|---|---|
| 2006/0101355 A1 | 5/2006 | Ciplickas |
| 2011/0131077 A1 | 6/2011 | Tan |
| 2013/0307962 A1* | 11/2013 | Humphries ........ G01N 21/9508 348/86 |
| 2014/0330793 A1 | 11/2014 | Chamness |
| 2015/0045928 A1 | 2/2015 | Perez et al. |
| 2015/0057784 A1 | 2/2015 | Butler et al. |
| 2015/0142153 A1 | 5/2015 | Chun |
| 2015/0309494 A1* | 10/2015 | Kobayashi ............ B33Y 50/00 700/98 |
| 2015/0355101 A1* | 12/2015 | Sun ........................ G06T 7/586 348/46 |
| 2016/0176114 A1* | 6/2016 | Tsai ...................... B29C 64/393 700/98 |
| 2016/0236414 A1 | 8/2016 | Reese et al. |
| 2017/0341183 A1 | 11/2017 | Buller et al. |
| 2017/0355146 A1 | 12/2017 | Buller |
| 2018/0082163 A1 | 3/2018 | Flores et al. |
| 2018/0117850 A1 | 5/2018 | Schwartz et al. |
| 2018/0150263 A1 | 5/2018 | Harayama et al. |

* cited by examiner

CUSTOM THREE-DIMENSIONAL (3D) PRINT MODE GENERATION

BACKGROUND

Three-dimensional (3D) printing is dramatically changing the manufacturing landscape. Via 3D printing, articles and components may be manufactured without the resources of a factory or other large-scale production facility. Additive manufacturing systems produce three-dimensional (3D) objects by building up layers of material and combining those layers using adhesives, heat, chemical reactions, and other coupling processes. Some additive manufacturing systems may be referred to as "3D printing devices." The additive manufacturing systems make it possible to convert a computer aided design (CAD) model or other digital representation of an object into a physical object. Digital data is processed into slices each defining that part of a layer or layers of build material to be formed into the object.

BRIEF DESCRIPTION OF THE DRAWINGS

The accompanying drawings illustrate various examples of the principles described herein and are part of the specification. The illustrated examples are given merely for illustration, and do not limit the scope of the claims.

Figure 1:
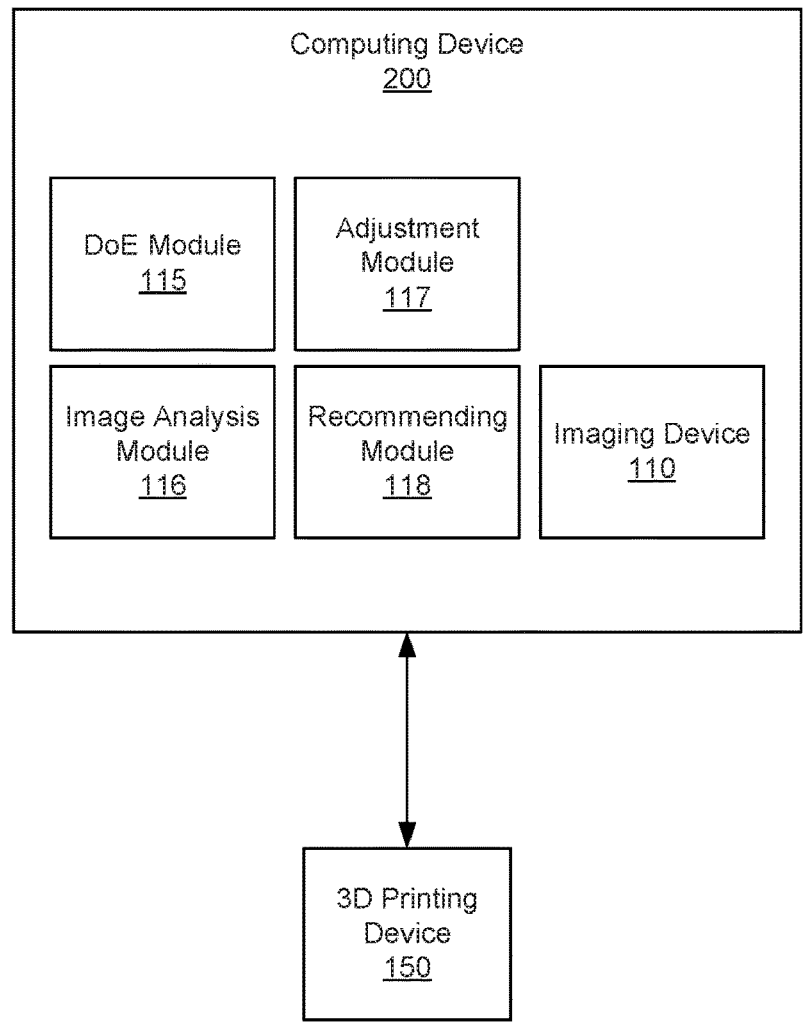
FIG. 1 is a block diagram of a system for generating custom three-dimensional (3D) print modes, according to an example of the principles described herein.

Throughout the drawings, identical reference numbers designate similar, but not necessarily identical, elements. The figures are not necessarily to scale, and the size of some parts may be exaggerated to more clearly illustrate the example shown. Moreover, the drawings provide examples and/or implementations consistent with the description; however, the description is not limited to the examples and/or implementations provided in the drawings.

DETAILED DESCRIPTION

Some 3D printing systems provide for a large number of printing parameters and a number of sensor readings that may be monitored to obtain a desired part quality of a printed or built 3D object (herein referred to as a part). For example, a jet fusion 3D printing system developed and distributed by HP, Inc. may include more than 700 process parameters and sensor readings that are monitored to achieve the desired part quality. While 3D printing systems account for a large variety of these process parameters and sensor readings, some 3D printing systems include a relatively smaller number of built-in printing modes such as, for example, a couple printing modes to several printing modes. A user of a 3D printing system may desire custom printing modes so that they may obtain a superior print quality in the parts they seek to build using the 3D printing system. A custom mode may be uniquely tuned to address a number of printing issues the user experiences in printing the parts using a built-in printing mode.

Further, there may exist a unit-to-unit variance between 3D printing systems that creates additional irregularities or inconsistencies in the printed parts. This may be the case even when the same firmware, software and hardware are used in the different 3D printing systems. This may suggest that an assessment of the parts produced on each unit may be made in order to tune individual 3D printing systems to have individualized custom printing modes. Still further, determining process settings for a custom mode may prove to be a multi-objective optimization process. A user of a 3D printing system may find it challenging to account for and address the vast number of parameters that may be adjusted in order to obtain the desired print quality in the parts they seek to build using the 3D printing system. The terms "built" and "printed" are used exchangeably herein to denote the formation of the part using a 3D printing system.

Examples described herein provide a method of custom print mode generation in a three-dimensional (3D) printing device. The method may include printing a plurality of parts with a plurality of 3D printing devices, the parts each being printed using different process parameters, and capturing a plurality of images of the parts. The method may also include, with an image analysis module, analyzing the images to classify the parts into a plurality of defect gradings, and adjusting a number of the process parameters based on characteristics of the parts identified by a user as undesirable. The examiner may also include, with a recommending module, creating a custom print mode based on the parts defect gradings and adjusted process parameters.

The parts may include at least one user-defined part and at least one reference part. Capturing the plurality of images of the parts includes, rearranging the parts with a robotic arm, rearranging the parts using a shaking mechanism, capturing the parts in a plurality of lighting conditions, capturing the parts in a plurality of wavelengths of light, or combinations thereof. The process parameters include fusing lamp power levels, fusing lamp scan speeds, warming lamp power levels, warming lamp scan speeds, powder temperatures, humidity levels, powder dose volumes, spreader roller rotation velocities, spreader roller transverse velocities, fusing agent density levels, cooling agent density levels, build material melting points, build material crystallization temperatures, build material conductivity, build material thermal mass values, build material thermal properties, build material densities, build material flowability, build material friction properties, build material mechanical properties, part model used, a number of layers assigned to a core of the part model used, a number of layers assigned to a mantle of the part model used, a number of layers assigned to a shell of the part model used, part post processing methods used, percentage of part expansion of an original geometry of the part, percentage of part dilation of the original geometry of the part, or combinations thereof.

Creating the custom print mode based on the adjusted process parameters includes performing a plurality of iterations of printing the plurality of parts with the plurality of 3D printing devices, each iteration including different process parameters. Capturing the plurality of images of the parts may include capturing the images in a visible electromagnetic spectrum, an infrared electromagnetic spectrum, an ultraviolet electromagnetic spectrum, a 3D imaging device, and combinations thereof. Creating the custom print mode based on the parts defect gradings and adjusted process parameters may include, with the recommending module, calculating a nominal logistic regression to predict a likelihood of obtaining different defect types using different process parameters.

Examples described herein provide a non-transitory computer readable medium including computer usable program code embodied therewith. The computer usable program code, when executed by a processor, presents a plurality of settings defining a plurality of optimizable process parameters, and present an indication of part quality for a selection of at least one of the settings for a part to be printed using a 3D printing device. The indication of part quality is based on previously classified part defect gradings.

The computer readable medium may include computer usable program code to, when executed by the processor, capture a plurality of images of a plurality of parts printed using a 3D printing device, the parts each being printed using different process parameters executing a design of experiments (DoE) process, and, with an image analysis module, analyze the images to classify the parts into the part defect gradings. The computer readable medium may include computer usable program code to, when executed by the processor, adjust a number of the process parameters based on characteristics of the parts identified by a user as undesirable, and, with a recommending module, create a custom print mode based on the part defect gradings and adjusted process parameters. The DoE process includes varying the process parameters of each of the builds of each part, and evaluating an impact of the process parameters and the interactions of the process parameters on the parts.

Capturing the plurality of images of the parts may include rearranging the parts with a robotic arm, rearranging the parts using a shaking mechanism, capturing the parts in a plurality of lighting conditions, capturing the parts in a plurality of wavelengths of light, capturing the images in a visible electromagnetic spectrum, capturing the images in an infrared electromagnetic spectrum, capturing the images in an ultraviolet electromagnetic spectrum, or combinations thereof. The process parameters include fusing lamp power levels, fusing lamp scan speeds, warming lamp power levels, warming lamp scan speeds, powder temperatures, humidity levels, powder dose volumes, spreader roller rotation velocities, spreader roller transverse velocities, fusing agent density levels, cooling agent density levels, build material melting points, build material crystallization temperatures, build material conductivity, build material thermal mass values, build material thermal properties, build material densities, build material flowability, build material friction properties, build material mechanical properties, or combinations thereof. The previously classified defect gradings are a product of an analysis performed using a neural network. Creating the custom print mode based on the parts defect gradings and adjusted process parameters includes, with the recommending module, calculating a nominal logistic regression to predict a likelihood of obtaining different defect types using different process parameters.

Examples described herein provide a system for generating custom three-dimensional (3D) print modes. The system may include a design of experiments (DoE) module to instruct at least one 3D printing device to print a plurality of parts. The parts are each printed using different process parameters. The DoE module varies the process parameters of each of the builds of each part, and evaluates an impact of the process parameters and the interactions of the process parameters on the parts. The system may also include an imaging device to capture a plurality of images of the plurality of parts, an image analysis module to classify the parts into a plurality of defect gradings, and an adjustment module to adjust a number of the process parameters based on characteristics of the parts identified by a user as undesirable. The system may also include a recommending module to create a custom print mode based on the parts defect gradings and adjusted process parameters. The system may also include a part reorientation device to reorient the parts. The part reorientation device includes a robotic arm, a shaking mechanism, or combinations thereof.

Examples provided herein include apparatuses, processes, and methods for generating three-dimensional (3D) objects. Apparatuses for generating three-dimensional objects may be referred to as additive manufacturing apparatuses. Example apparatuses described herein may correspond to three-dimensional printing systems, which may also be referred to as 3D printing devices or 3D printers. In an example of an additive manufacturing process, a layer of build material may be formed in a build area, a fusing agent may be selectively distributed on the layer of build material, and energy may be temporarily applied to the layer of build material. As used herein, a build layer may refer to a layer of build material formed in a build area upon which agent may be distributed and/or energy may be applied.

Additional layers may be formed and the operations described above may be performed for each layer to thereby generate a three-dimensional object. Sequentially layering and fusing portions of layers of build material on top of previous layers may facilitate generation of the three-dimensional object. The layer-by-layer formation of a three-dimensional object may be referred to as a layer-wise additive manufacturing process.

In examples described herein, a build material may include a powder-based build material, where powder-based build material may include wet and/or dry powder-based materials, particulate materials, and/or granular materials. In some examples, the build material may be a weak light absorbing polymer. In some examples, the build material may be a thermoplastic material or a metal material such as a metal powder material. Furthermore, as described herein, agent may include fluids that may facilitate fusing of build material when energy is applied. In some examples, the agent may be referred to as coalescing or fusing agent. In some examples, agent may be a light absorbing liquid, an infrared or near infrared absorbing liquid, such as a pigment colorant. In some examples at least two types of agent may be selectively distributed on a build layer. In some examples at least one agent may inhibit fusing of build material when energy is applied.

Example apparatuses may include an agent distributor. In some examples, an agent distributor may include at least one fluid ejection device. A fluid ejection device may include at least one printhead such as, for example, a thermal ejection based printhead, a piezoelectric ejection based printhead, other fluid ejection devices, or combinations thereof. An agent distributor may be coupled to a scanning carriage, and the scanning carriage may move along a scanning axis over the build area. In one example, printheads suitable for implementation in commercially available inkjet printing devices may be implemented as an agent distributor. In other examples, an agent distributor may include other types of fluid ejection devices that selectively eject small volumes of fluid.

In some examples, an agent distributor may include at least one fluid ejection device that includes a plurality of fluid ejection dies arranged generally end-to-end along a width of the agent distributor. In some examples, the at least one fluid ejection device may include a plurality of printheads arranged generally end-to-end along a width of the agent distributor. In such examples, a width of the agent distributor may correspond to a dimension of a build area. For example, a width of the agent distributor may correspond to a width of a build area. An agent distributor may selectively distribute agent on a build layer in the build area concurrent with movement of the scanning carriage over the build area. In some example apparatuses, the agent distributor may include nozzles including nozzle orifices through which agent may be selectively ejected. In such examples, the agent distributor may include a nozzle surface in which a plurality of nozzle orifices may be formed.

In some examples, apparatuses may include a build material distributor to distribute build material in the build area. A build material distributor may include, for example, a wiper blade, a roller, and/or a spray mechanism. In some examples, a build material distributor may be coupled to a scanning carriage. In these examples, the build material distributor may form build material in the build area as the scanning carriage moves over the build area along the scanning axis to thereby form a build layer of build material in the build area.

As used in the present specification and in the appended claims, the term "design of experiments (DoE)" is meant to be understood broadly as any design of any task that aims to describe or explain the variation of information under conditions that are hypothesized to reflect the variation. The term is associated with experiments in which the design introduces conditions that directly affect the variation, but may also refer to the design of quasi-experiments, in which natural conditions that influence the variation are selected for observation. In the examples described herein, a DoE process may be used in connection with the creation of a custom print mode as a number of experimental builds of parts may be conducted to identify and correct any print defects or instances of lack in part quality.

Turning now to the figures, FIG. 1 is a block diagram of a system (100) for generating custom three-dimensional (3D) print modes, according to an example of the principles described herein. The system (100) is used to create print modes that, when utilized, serve to build a desired part that has a number of acceptable characteristics that reflect the quality of the built or printed part the user is seeking to produce. These acceptable characteristics include an appropriate look and feel, a cosmetic appearance, dimensional accuracy in the part, a strength within the part, and a myriad of additional characteristics that may be desirable by a user, and combinations thereof.

The system (100) may include a number of modules and devices included within a computing device (200). Although the computing device (200) is depicted in FIG. 1 as being separate from a 3D printing device (150), in one example, the computing device (200) and the 3D printing device (150) may be integrated into a single device.

The computing device (200) of the system (100) may include a design of experiments (DoE) module (115) to instruct at least one 3D printing device (150) to print a plurality of parts. The parts built may each be printed using different process parameters, and the DoE module (115) may vary the process parameters of each of the builds of each part. By varying the process parameters of each build of each part, the 3D printing device (150) may produce a part among those built parts that has the desired qualities or combinations of qualities that the user is seeking to obtain on the part. The DoE module (115) may also evaluate an impact of the process parameters and the interactions of the process parameters on the parts as they are built. In this manner, a specific combination of selected process parameters may be used to form a part with the user's desired characteristics and qualities. This specific combination of selected process parameters may then be identified and stored as a custom print mode the user may select when printing the part in future batches of a build using the 3D printing device (150). The DoE module (115) varies the process parameters of each of the builds of each part, and evaluates an impact of the process parameters and the interactions of the process parameters on the parts. Thus, the DoE module (115), by varying the process parameters of each of the builds of each part, serves to identify and generate a custom print mode for the user.

The process parameters may be any instruction to the 3D printing device that may be changed or adjusted, and may include, for example, fusing lamp power levels, fusing lamp scan speeds, warming lamp power levels, warming lamp scan speeds, powder temperatures, humidity levels, powder dose volumes, spreader roller rotation velocities, spreader roller transverse velocities, fusing agent density levels, cooling agent density levels, build material melting points, build material crystallization temperatures, build material conductivity, build material thermal mass values, build material thermal properties, build material densities, build material flowability, build material friction properties, build material mechanical properties, part model used, a number of layers assigned to a core of the part model used, a number of layers assigned to a mantle of the part model used, a number of layers assigned to a shell of the part model used, part post processing methods used, percentage of part expansion of an original geometry of the part, percentage of part dilation of the original geometry of the part, and combinations thereof.

The computing device (200) of the system (100) may also include an imaging device (110) to capture a plurality of images of the plurality of parts after they have been built. The parts may go through a de-caking process where the parts are separated from a powder bed that is used to build the parts. Further, the parts may be subjected to a number of post-printing processes such as sanding, sand blasting, milling, tumbling, varnishing, dyeing, cutting, melting, other post-printing processes, or combinations thereof. The imaging device (110) to capture a plurality of images of the plurality of parts before and/or after the de-caking and post-printing processes are performed. The imaging device (110) may capture images of the printed parts in any number of wavelengths such as infrared (IR), visible, and ultraviolet (UV) wavelengths. Further, the imaging device (110) may capture the parts in a plurality of lighting conditions using a plurality of lighting devices in connection with the imaging device (110). Capturing images of the parts in a variety of wavelengths may allow the image analysis module (116) described herein to analyze the parts in a more detailed manner. Because the imaging device (110) may be stationary with respect to a print zone of the 3D printing device (150), the images captured by the imaging device (110) may include fewer than all surfaces of the parts printed by the 3D printing device. Thus, in an example, the system (100) may also include a part reorientation device (FIG. 2, 111) to reorient the parts within the print zone. The part reorientation device (FIG. 2, 111) may include, for example, a robotic arm that handles the parts and reorients them so that the imaging device (110) may capture images of several sides of each of the parts. In another example, the part reorientation device (FIG. 2, 111) may include a shaking mechanism coupled to the print zone that shakes the parts into another orientation. In another example, the part reorientation device (FIG. 2, 111) may include a rail upon which the imaging device (110) may travel so that the imaging device (110) may capture images at different angles and of different surfaces of the parts. In still another example, the part reorientation device (FIG. 2, 111) may include combinations of these devices.

In one example, the imaging device (110) may include a color camera and 3D part scanning device integrated into the 3D printing device (150). The 3D part scanning device may include a platen motion device that moves the parts as the parts are situated on the platen to allow the perspective of the 3D part scanning device to change in order to capture images at different angles of the parts. The motion of the platen may be used to improve performance of the integrated 3D part scanning device by allowing the lighting and image analysis to be measured in a series of overlapping narrow Z-slices. Further, the motion of the platen may be used to introduce intentional offsets in X position. A fixture may be used to introduce controlled part rotations between images.

An image analysis module (116) may be included in the computing device (200) to classify the parts into a plurality of defect gradings. Because the 3D printing device may use a variety of build materials, binding agents, detailing agents and other materials during the printing process, and because the DoE module (115) varies the processes parameters that are associated with these materials, the printed parts may vary in appearance and structural strength. The image analysis module (116) may analyze the images captured by the imaging device (110), and grade the parts based on the visual aspects of the parts. Because the images of the parts may be captured in a variety of wavelengths, the image analysis module (116) may obtain more information appertaining to those different wavelengths than may be obtained from images of a single wavelength.

Figure 2:
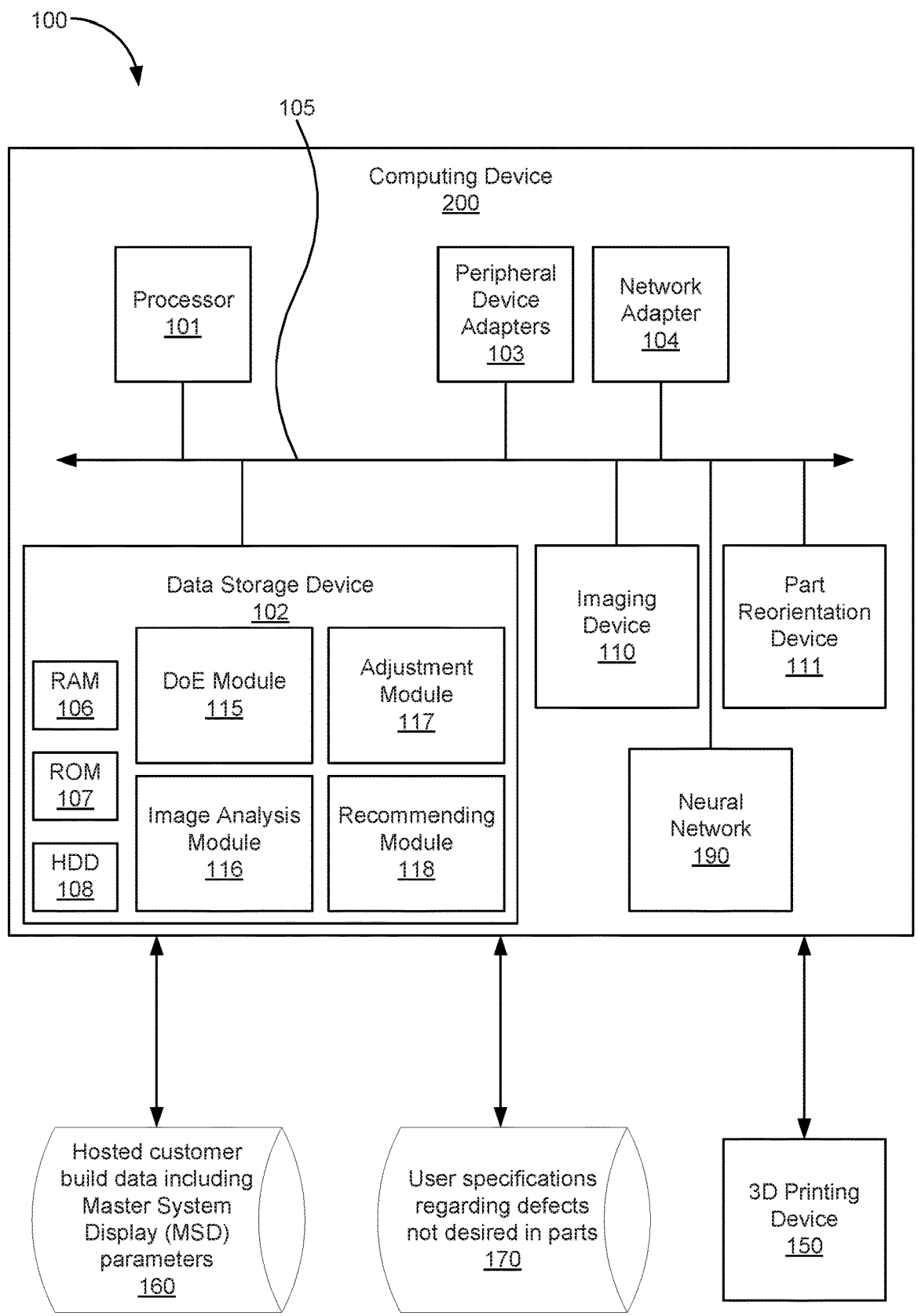
FIG. 2 is a block diagram of a system for generating custom three-dimensional (3D) print modes, according to an example of the principles described herein.

The defect gradings may be performed in an automated fashion, may be performed by a human assigning gradings to the printed parts, or may be graded using both automated and human input. The gradings may be stored in memory such as the data storage device (FIG. 2, 102). The defect gradings may be stored with corresponding process parameters that were used to build the parts. Other information such as date built, the specific 3D printing device (150) used to print the part, the orientation of the part within the 3D printing device (150), environmental states such as temperatures and humidity levels during printing of the part, and other data may also be stored in connection with each of the defect gradings and process parameters.

The types of defects the image analysis module (116) may identify and classify may include, for example: holes in the part, any layer position errors (LPEs), layer contours, thermal bleeding within and between parts and the layers thereof, whether parts do or do not fit together, capillarity of the parts, fusing uniformity, warpage, yellowing of materials used to build the parts, elephant skin created on the surfaces of the parts, interference between the parts and the material ejection devices used to create the parts, die trough, wave defects, shadow defects, the creation of fragile portions of the part, cracking of portions of the parts, extrusion defects, melted portions of the parts, indentation within the parts, rough surfaces created on the part, color uniformity, other possible types of part defects created through the printing of the parts, or combinations thereof. The image analysis module (116) may detect these defects, if they exist, in the part and grade the parts based on those defects.

The computing device (200) of the system (100) may also include an adjustment module (117) to adjust a number of the process parameters based on characteristics of the parts identified by a user as undesirable. As the defect gradings identified via the image analysis module (116) are obtained, the process parameters may be adjusted to correct the defects in future builds of the part. In one example, a number of adjustable process parameters may be presented to a user by the adjustment module (117) in a graphical user interface (GUI). In another example, at least one of the process parameters may be automatically adjusted by the adjustment module (117). In still another example, the process parameters may be automatically adjusted by the adjustment module (117) and adjustable by the user via the GUI presented by the adjustment module (117).

The process parameters include any parameters associated with the building or printing of a part. Examples of the process parameters that may be adjustable by the adjustment module (117) include: fusing and warming lamp powers and scan speeds, powder temperature and humidity levels, powder dose volumes, spread roller rotation and transverse velocities, fusing and/or cooling agent density levels for the core and part surfaces of the parts, activation and speed of fans used to cool the fusing, warming lamps and print zone, the mass of build material dispensed by a hopper device and the speed at which the material is dispensed, the functioning of a humidifier within the print zone of the 3D printing device (150), other printing parameters, and combinations thereof. The processes performed by the DoE module (115), the image analysis module (116), and the adjustment module (117) may be performed any number of iterations until the user's desired characteristics are found in the part, the user's undesired characteristics are not found in the part, or a combination thereof.

The computing device (200) of the system (100) may also include a recommending module (118) to create a custom print mode based on the parts defect gradings and adjusted process parameters. The recommending module (118) creates the custom print mode based on the outcomes of the DoE module (115), the image analysis module (116), and the adjustment module (117) and the number of iterations the process parameters are adjusted. The recommending module (118) also presents the custom print mode to a user for selection among other types of print modes. The 3D printing device (150) if the system (100) may include, for example, a number of built-in print modes. The built-in print modes may be non-custom print modes that form part of the firmware of the 3D printing device (150) and are user-selectable print modes presented by the 3D printing device (150) for user selection. The built-in print modes may include, for example, a cosmetic print mode that includes process parameters directed to optimizing the look and feel of the printed parts, a dimensional accuracy print mode that includes process parameters directed to optimizing the dimensions of the parts with as high of tolerances with respect to the designed dimensions, and a high strength print mode that includes process parameters directed to optimizing the strength of the part, among other built-in print modes.

In one example, the DoE module (115), the image analysis module (116), the adjustment module (117), and the recommending module (118) may be operated remotely by the user such that the user may receive information regarding the outcome of these modules (115, 116, 117, 118) as a service. In this manner, the generation of a custom print mode may be based on the capability to remotely perform the processing provided by the DoE module (115), the image analysis module (116), the adjustment module (117), and the recommending module (118) to optimize part quality and build reliability with the user's powder material, processing environment, part attribute objectives and other parameters being considered. More details regarding the system (100) for generating custom three-dimensional (3D) print modes is described herein in connection with FIG. 2.

FIG. 2 is a block diagram of the system (100) for generating custom three-dimensional (3D) print modes, according to an example of the principles described herein. The system (100) may be implemented at least partially in an electronic device. Examples of electronic devices include servers, desktop computers, laptop computers, personal digital assistants (PDAs), mobile devices, smartphones, gaming systems, and tablets, among other electronic devices.

The system (100) may be utilized in any data processing scenario including, stand-alone hardware, mobile applications, through a computing network, or combinations thereof. Further, the system (100) may be used in a computing network, a public cloud network, a private cloud network, a hybrid cloud network, other forms of networks, or combinations thereof. In one example, the methods provided by the system (100) are provided as a service over a network by, for example, a third party. In this example, the service may include, for example, the following: a Software as a Service (SaaS) hosting a number of applications; a Platform as a Service (PaaS) hosting a computing platform including, for example, operating systems, hardware, and storage, among others; an Infrastructure as a Service (IaaS) hosting equipment such as, for example, servers, storage components, network, and components, among others; application program interface (API) as a service (APIaaS), other forms of network services, or combinations thereof. The present systems may be implemented on one or multiple hardware platforms, in which the modules in the system can be executed on one or across multiple platforms. Such modules can run on various forms of cloud technologies and hybrid cloud technologies or offered as a SaaS (Software as a service) that can be implemented on or off the cloud. In another example, the methods provided by the system (100) are executed by a local administrator. "Modules" as used herein include any combination of hardware and software that function to bring about the methods described herein. In one example, a module may an application specific integrated circuit (ASIC) communicatively coupled to the processor (101).

To achieve its desired functionality, the system (100) includes various hardware components. Among these hardware components may be a processor (101), a data storage device (102), a peripheral device adapter (103), a network adapter (104), an imaging device (110), and a part reorganization device (111). These hardware components may be interconnected through the use of a number of busses and/or network connections such as via a bus (105).

The processor (101) may include the hardware architecture to retrieve executable code from the data storage device (102) and execute the executable code. The executable code may, when executed by the processor (101), cause the processor (101) to implement at least the functionality of printing a plurality of parts with a plurality of 3D printing devices, the parts each being printed using different process parameters, and capturing a plurality of images of the parts. The functionality may also include with an image analysis module, analyzing the images to classify the parts into a plurality of defect gradings, and adjusting a number of the process parameters based on characteristics of the parts identified by a user as undesirable. The functionality may also include, with a recommending module, creating a custom print mode based on the parts defect gradings and adjusted process parameters. Further, the functionality may include presenting a plurality of settings defining a plurality of optimizable parameters, and presenting an indication of part quality for a selection of at least one of the settings for a part to be printed using a 3D printing device where the indication of part quality is based on previously classified part defect gradings. These functionalities and others are present in the system (100) according to the methods of the present specification described herein. In the course of executing code, the processor (101) may receive input from and provide output to a number of the remaining hardware units.

The data storage device (102) may store data such as executable program code that is executed by the processor (101) or other processing device. As will be discussed, the data storage device (102) may specifically store computer code representing a number of applications that the processor (101) executes to implement at least the functionality described herein.

The data storage device (102) may include various types of memory modules, including volatile and nonvolatile memory. For example, the data storage device (102) of the present example includes Random Access Memory (RAM) (106), Read Only Memory (ROM) (107), and Hard Disk Drive (HDD) memory (108). Many other types of memory may also be utilized, and the present specification contemplates the use of many varying type(s) of memory in the data storage device (102) as may suit a particular application of the principles described herein. In certain examples, different types of memory in the data storage device (102) may be used for different data storage needs. For example, in certain examples the processor (101) may boot from Read Only Memory (ROM) (107), maintain nonvolatile storage in the Hard Disk Drive (HDD) memory (108), and execute program code stored in Random Access Memory (RAM) (106).

The data storage device (102) may include a computer readable medium, a computer readable storage medium, or a non-transitory computer readable medium, among others. For example, the data storage device (102) may be, but not limited to, an electronic, magnetic, optical, electromagnetic, infrared, or semiconductor system, apparatus, or device, or any suitable combination of the foregoing. More specific examples of the computer readable storage medium may include, for example, the following: an electrical connection having a number of wires, a portable computer diskette, a hard disk, a random-access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store computer usable program code for use by or in connection with an instruction execution system, apparatus, or device. In another example, a computer readable storage medium may be any non-transitory medium that can contain, or store a program for use by or in connection with an instruction execution system, apparatus, or device.

The hardware adapters (103, 104) in the system (100) enable the processor (101) to interface with various other hardware elements, external and internal to the system (100). For example, the peripheral device adapters (103) may provide an interface to input/output devices, such as, for example, display device, a mouse, or a keyboard. The peripheral device adapters (103) may also provide access to other external devices such as an external storage device, a number of network devices such as, for example, servers, switches, and routers, client devices, other types of computing devices, and combinations thereof. The peripheral device adapters (103) may also create an interface between the processor (101) and a display device, a printer, or other media output devices. The network adapter (104) may provide an interface to other computing devices within, for example, a network, thereby enabling the transmission of data between the system (100) and other devices located within the network.

The system (100) may, when executed by the processor (101), display the number of graphical user interfaces (GUIs) on the display device (109) associated with the executable program code representing the number of applications stored on the data storage device (102). The GUIs may include aspects of the executable code including presenting a plurality of settings defining a plurality of optimizable parameters, and presenting an indication of part quality for a selection of at least one of the settings for a part to be printed using a 3D printing device where the indication of part quality is based on previously classified part defect gradings.

The system (100) further includes a number of modules used in the implementation of the functionality of the processor (101) described herein. The various modules within the system (100) include executable program code that may be executed separately. In this example, the various modules may be stored as separate computer program products. In another example, the various modules within the system (100) may be combined within a number of computer program products; each computer program product including a number of the modules.

The system (100) may include the DoE module (115), the image analysis module (116), the adjustment module (117), and the recommending module (118) described herein in connection FIG. 1. These modules work together to identify process parameters in any number of build iterations that may be used or considered in creating a custom print mode for the 3D printing device (150). The system (100) of FIG. 2 may also include hosted customer build data (160) that includes master system display (MSD) parameters. The customer or user seeking to have the parts built on the 3D printing device (150) provides the build data to the 3D printing device (150) and/or the computing device (200) in the form of a 3D printing file format such as a 3D manufacturing format (3MF) file format, stereolithography (STL) file format, additive manufacturing format (AMF) file format, Wavefront Object (OBJ) file format, virtual reality modeling language (VRML) file format, X3D XML-based file format, Filmbox (FBX) file format, initial graphics exchange specification (IGES) file format, ISO 10303 (STEP) file format, other types of 3D printing file formats, and combinations thereof. The MSD parameters may form part of the 3D printing file MSD is an interface used by the 3D printing device (150) for the collection and visualization of process parameters, fusing recipe targets, and various sensor readings. For example, lamp power managements (PWMs), heater plate PWMs, and readings from sensors to monitor humidity, air flow or the temperature observed through an IR camera (i.e., where the imaging device (110) captures IR wavelengths).

The system (100) of FIG. 2 may also include user specifications (170) regarding defects not desired in the parts to be printed on the 3D printing device (150). The user may provide these specifications in the form of process parameters that effect the manner in which the 3D printing device (150) builds the parts.

The DoE module (115) may be executed where a number of process parameters are intentionally varied on each build iteration so that the impact and interaction of the process parameters may be evaluated. Again, of the process parameters that may be adjustable by the adjustment module (117) include: fusing and warming lamp powers and scan speeds, powder temperature and humidity levels, powder dose volumes, spread roller rotation and transverse velocities, fusing and/or cooling agent density levels for the core and part surfaces of the parts, activation and speed of fans used to cool the fusing, warming lamps and print zone, the mass of build material dispensed by a hopper device and the speed at which the material is dispensed, the functioning of a humidifier within the print zone of the 3D printing device (150), other printing parameters, and combinations thereof. In one example, if a new customer material is being optimized for example, the initial process parameter settings of the build may be roughly tuned for the new material so that the DoE parameters are varied within a reasonable target range. Initial validation of basic material properties may also be provided to the system (100) using data regarding the material such as the melting point, crystallization temperature, conductivity, thermal mass, other thermal properties, density and powder flowability, friction mechanical properties, other physical properties of the new material, and combinations thereof.

In this manner, a set of pre-screening diagnostic routines targeted at each subsystem and performed to validate basic material performance before starting the larger DoE processes via the DoE module (115) may be performed. These pre-screening diagnostic routines may vary the process parameters over a wider range, and identify the process parameter ranges for the DoE processes performed by the DoE module (115). Diagnostics targeted at specific subsystems may have targeted DoE settings and imaging and other performance metrics to efficiently measure subsystem performance. For example, the performance metrics may include powder dosing performance, powder spreading performance, fusing performance including an analysis of energy versus temperature, degree of melt, and other calibrations, other performance metrics and combinations thereof.

Because different 3D printing devices (150) may function differently, the builds used to generate the custom print mode may be executed in a 3D printing device (150) with a validated good performance record. In one example, the 3D printing device may be validated with a pre-flight checkup that lamps, material spreading and dispensing devices, and other systems of the 3D printing device are not degraded and are functioning properly. By monitoring performance variables during the builds to insure they are within normal ranges the 3D printing device (150) may be validated as a properly functioning device. In one example, a report may be generated to highlight variables that are outside of normal ranges within the 3D printing device (150). For example, a southern California aerospace manufacturer building parts in the winter with Santa Ana winds causing extremely low humidity conditions may benefit from knowing that their custom print mode has been optimized for that extreme environment. In this example, the southern California aerospace manufacturer may, in order to measure build reliability and build defects that may prevent build completion or impact part quality at specific layer locations of the parts, may consider the frequency and severity of build reliability metrics, and optimizations for build reliability.

These build reliability metrics may include, for example, dosed powder volume and uniformity, spread surface texture uniformity, lifting of parts during the build process, dragging of parts during the build process, random defects in experimental builds that impact final part quality at specific layers, other build reliability metrics, and combinations thereof. Tracking of the layers where these defects occur may identify their impact on part quality. Thus, the DoE module (115), the image analysis module (116), the adjustment module (117), and the recommending module (118) may be executed to measure build reliability metrics within the 3D printing device (150) and generate the report to highlight variables that are outside of normal ranges within the 3D printing device (150). In this manner, the process parameters of the 3D printing device (150), the properties of the materials used in the 3D printing process, and the build reliability of the 3D printing device (150) may all be considered when creation of the custom print mode is performed by the system (100).

In an example, the system (100) may also include a neural network (190) used to assist in the classification of any detected defects in the printed parts as identified by the image analysis module (116). A neural network is a network or circuit of neurons such as an artificial neural network, composed of artificial neurons or nodes used for solving artificial intelligence (AI) problems. The connections of the neural network may be modeled as weights. A positive weight reflects an excitatory connection, while negative values mean inhibitory connections. All inputs are modified by a weight and summed in a process referred as a linear combination. Thus, the neural network in this example may learn how detected defects are classified by the image analysis module (116) and autonomously classify any future detected defects on the basis of what the neural network has learned as the image analysis module (116) is executed.

Having described the system (100) including the functions of the computing device (200) and the 3D printing device (150) and their respective subsystems, the process by which the custom print mode may be created will now be described in connection with FIGS. 3 through 8.

Figure 3:
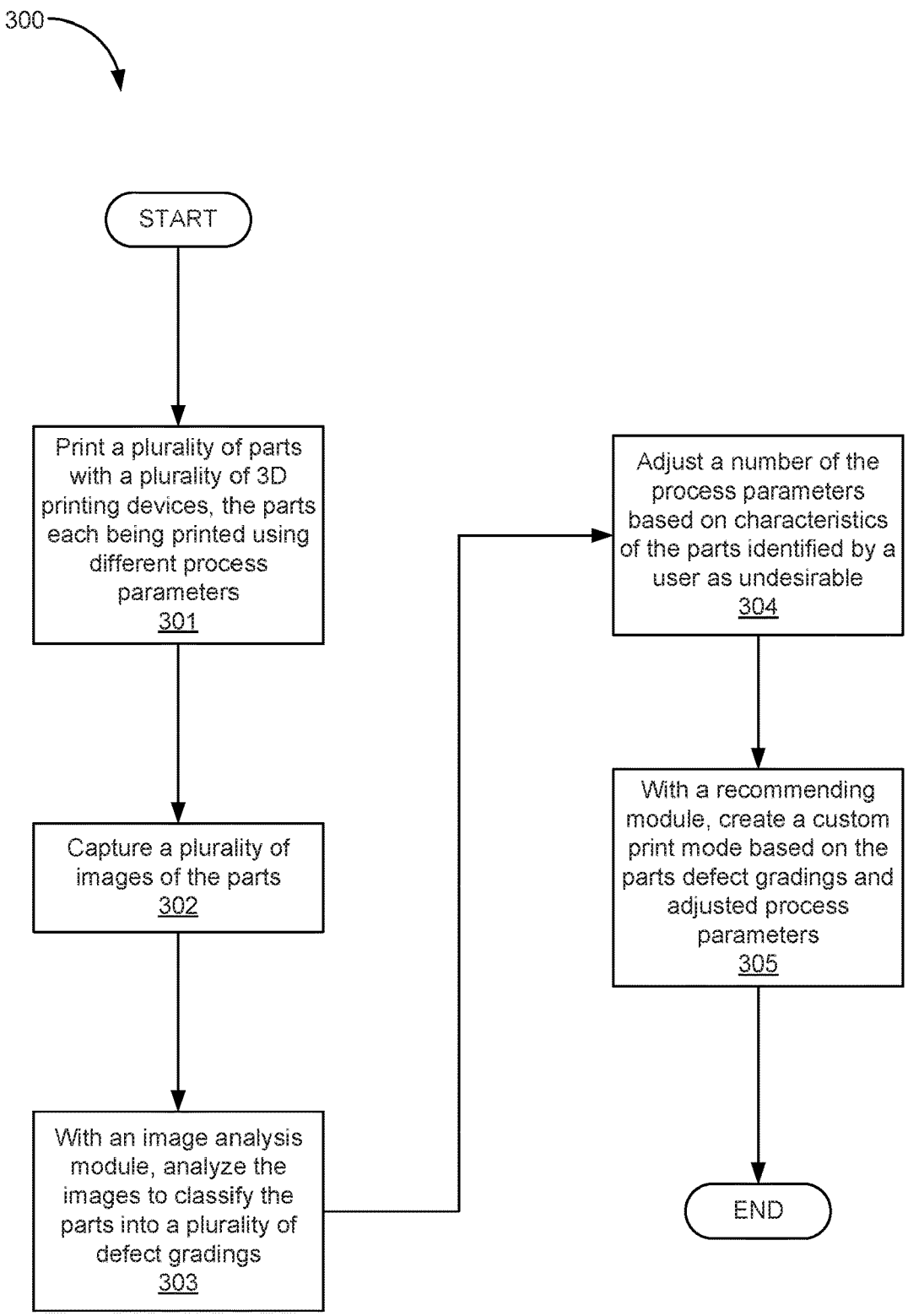
FIG. 3 is a flowchart showing a method of custom print mode generation in a 3D printing device, according to an example of the principles described herein.

FIG. 3 is a flowchart showing a method (300) of custom print mode generation in a 3D printing device (150), according to an example of the principles described herein. The method (300) may include printing (block 301) a plurality of parts with a plurality of 3D printing devices (150). The parts are each printed using different process parameters. Thus, while FIGS. 1 and 2 depict a single 3D printing device (150), multiple 3D printing devices (150) may be included in the system (100) in order to vary the process parameters among the parts. In another example, the process parameters may be varied among a plurality of parts within the same 3D printing device (150).

The method (300) may also include, with the imaging device (110), capturing (block 302) a plurality of images of the parts. The image analysis module may then be executed by the processor (101) to analyze (block 303) the images and classify the parts into a plurality of defect gradings. In one example, previously classified defect gradings may be a product of an analysis performed using the neural network (190) of FIG. 2.

A number of the process parameters may be adjusted (block 304) through execution of the adjustment module (117) based on characteristics of the parts identified by a user as undesirable. The images captured (block 302) by the imaging device (110) and analyzed (block 303) by the image analysis module (116) may be provided to a user, and the user may be made aware of what defects were present in the parts printed in the number of iterations of the part printing. The user may provide user specifications regarding the defects not desired in the printed parts via element 170 of FIG. 2, and this information may be used in forming at least part of the custom print mode.

The method (300) may also include, with the recommending module (118), creating (block 305) a custom print mode based on at least the parts defect gradings as obtained from the image analysis module (116) and adjusted process parameters as obtained from the adjustment module (117).

Figure 4:
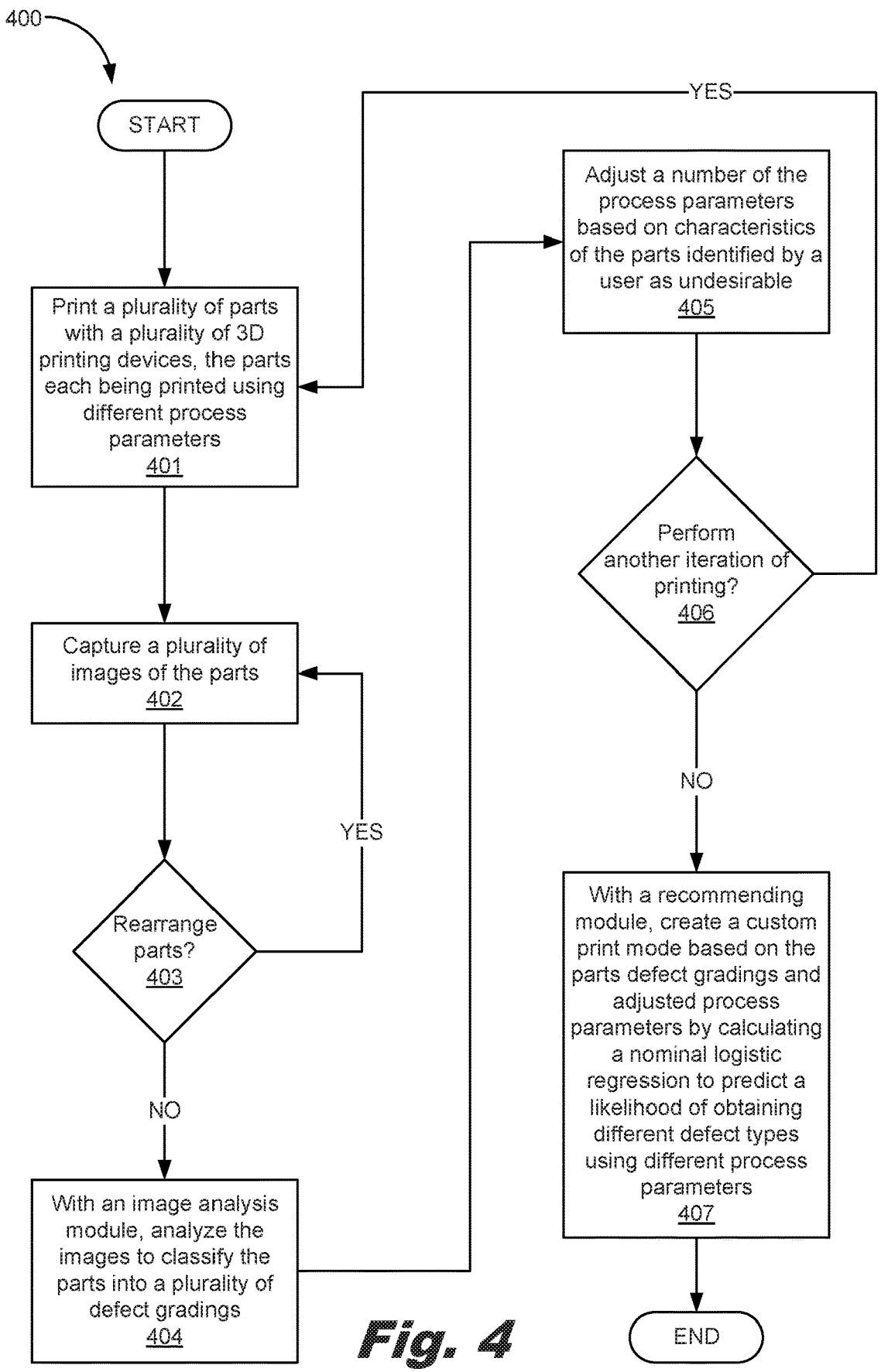
FIG. 4 is a flowchart showing a method of presenting a custom print mode generation in a 3D printing device, according to an example of the principles described herein.

FIG. 4 is a flowchart showing a method (400) of presenting a custom print mode generation in a 3D printing device (150), according to an example of the principles described herein. The method (400) of FIG. 4 may include printing (block 401) a plurality of parts with a plurality of 3D printing devices (150). In an example, the parts may include at least one user-defined part and at least one reference part. The user-defined part is any part that the user is seeking to have printed and for which a custom print mode is generated. The reference part may be any part that serves as a control to the other parts being printed so that comparisons may be made between the user-defined parts whose process parameters are varied and the reference parts whose process parameters are held constant. This minimizes the effects of the varying process parameters and increases the reliability of the results obtained from the DoE module (115), the image analysis module (116), the adjustment module (117). Further, as in FIG. 3, the imaging device (110) captures (block 402) a plurality of images of the parts. Capturing (block 402) the plurality of images of the parts may include capturing the images in a visible electromagnetic spectrum, an infrared electromagnetic spectrum, an ultraviolet electromagnetic spectrum, a 3D imaging device, and combinations thereof. Thus, the imaging device (110) may be capable of capturing images in any combination of these wavelengths.

In some examples, the imaging device (110) may not be able to capture an entirety of the parts as printed in the 3D printing device (150) because of the position of the parts relative to the field of view of the imaging device (110). Therefore, the system (100) may determine if the parts should be rearranged (block 403) in order to capture different surfaces of the parts that have been printed. In response to the determination that the parts should be rearranged (block 403, determination YES), the part reorientation device (111) serves to reorient these parts. As described herein, the part reorientation device (111) may include, for example, a robotic arm that handles the parts, a shaking mechanism coupled to the print zone that shakes the parts into another orientation, a rail upon which the imaging device (110) may travel so that the imaging device (110) may capture images at different angles and of different surfaces of the parts, and combinations thereof. In contrast, in response to the determination that the parts should not or do not need to be rearranged (block 403, determination NO), the method (400) may proceed to block 404.

At block 404, the image analysis module may then be executed by the processor (101) to analyze (block 404) the images and classify the parts into a plurality of defect gradings. The process parameters may be adjusted (block 405) through execution of the adjustment module (117) based on characteristics of the parts identified by a user as undesirable.

The method (400) may also include determining (block 406) whether to perform another iteration of printing the parts. In some examples, it may be desirable to have the parts printed again in order to increase the number of printed parts with even more varied process parameters and/or to print the parts with process parameters of a custom print mode defined by the adjustment module (117). Thus, creating (block 407) the custom print mode based on the adjusted process parameters includes performing a plurality of iterations of printing (block 401) the plurality of parts with the plurality of 3D printing devices (150) with each iteration (blocks 401 through 406) including different process parameters. Thus, in response to a determination (block 406, determination YES) that another iteration of printing the parts should be performed, the method (400) may loop back to block 401, and the number of iterations (blocks 401 through 406) may be performed in this manner. In contrast, in response to a determination (block 406, determination NO) that another iteration of printing the parts should not be performed, the method (400) may proceed to block 407).

The method (400) may also include, with the recommending module (118), creating (block 407) a custom print mode based on the parts defect gradings and adjusted process parameters.

In an example, block 407 may be performed by calculating a nominal logistic regression to predict a likelihood of obtaining different defect types using different process parameters. A nominal logistic regression is a statistical model that uses a logistic function to model a binary dependent variable. Logistic regression includes estimating the parameters of a logistic model and is a form of binomial regression. Mathematically, a binary logistic model includes a dependent variable with two possible values, such as pass/fail, win/lose, alive/dead or healthy/sick. In the examples described herein, the dependent variable is a pass/fail with regard to whether a process parameter or a combination of process parameters benefits the part as built and/or meets the user's specifications regarding defects not desired by the user in the parts (170) (i.e. those process parameters that are used to create the custom print mode). The dependent variables are represented by an indicator variable, where the two values are labeled "0" and "1". In the logistic model, the log-odds (the logarithm of the odds) for the value labeled "1" may include a linear combination of at least one independent variables referred to as predictors. The independent variables may each be a binary variable with two classes, coded by an indicator variable, or may be a continuous variable such as any real value. The corresponding probability of the value labeled "1" may vary between 0 and 1. The function that converts log-odds to probability is the logistic function.

Figure 5:
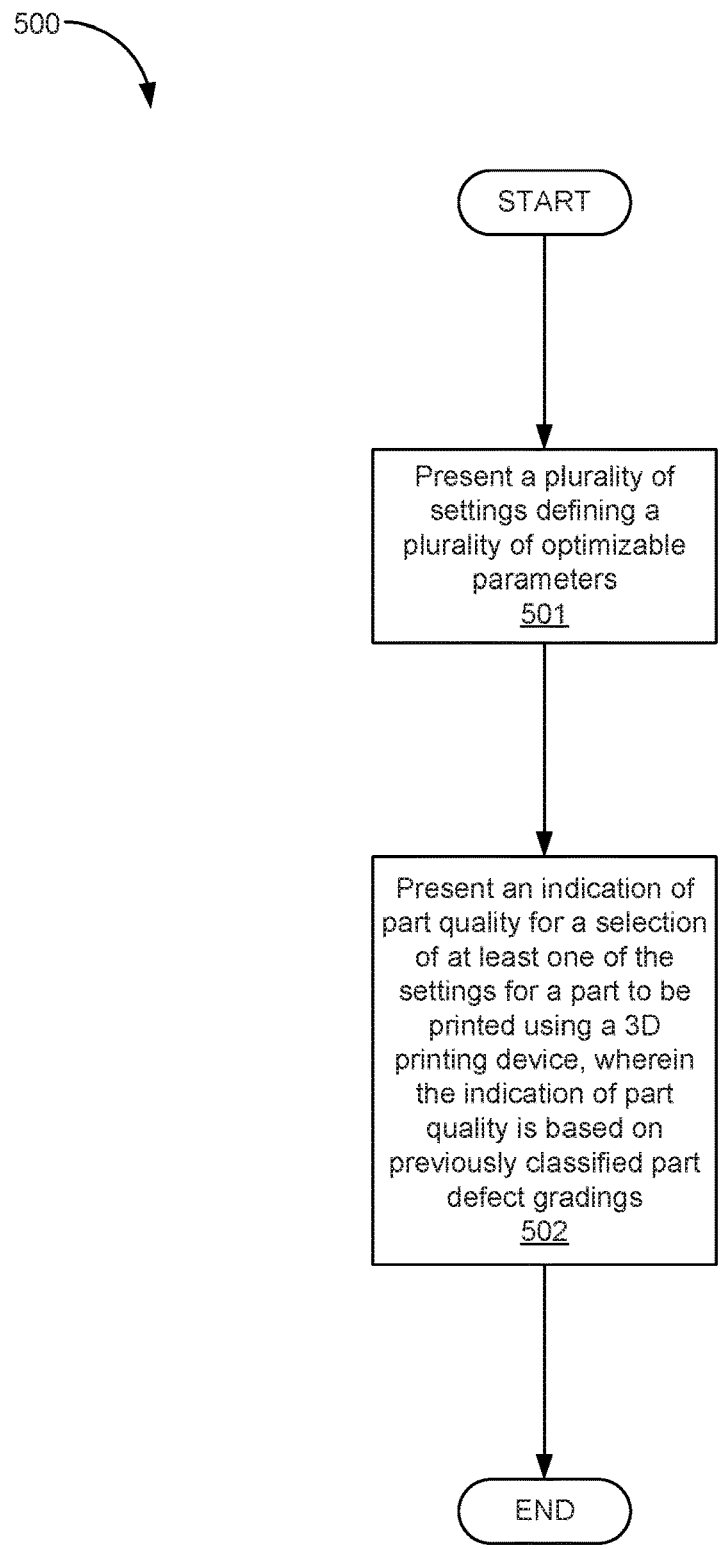
FIG. 5 is a flowchart showing a method of presenting to a user-selectable, custom print modes in a 3D printing device, according to an example of the principles described herein.

FIG. 5 is a flowchart showing a method (500) of presenting to a user-selectable, custom print modes in a 3D printing device, according to an example of the principles described herein. The method (500) of FIG. 5 may include presenting (block 501) a plurality of settings defining a plurality of optimizable process parameters to a user via, for example, a GUI created by the computing device (200). An indication of part quality for a selection of at least one of the settings for a part to be printed using a 3D printing device (150) may also be presented (block 502) to the user via the GUI. The indication of part quality may be based on previously classified part defect gradings. In this manner, the user may be made aware of the defect gradings of the parts and make changes to the settings that define the plurality of optimizable process parameters. More details regarding this method is presented herein in connection with FIG. 6.

Figure 6:
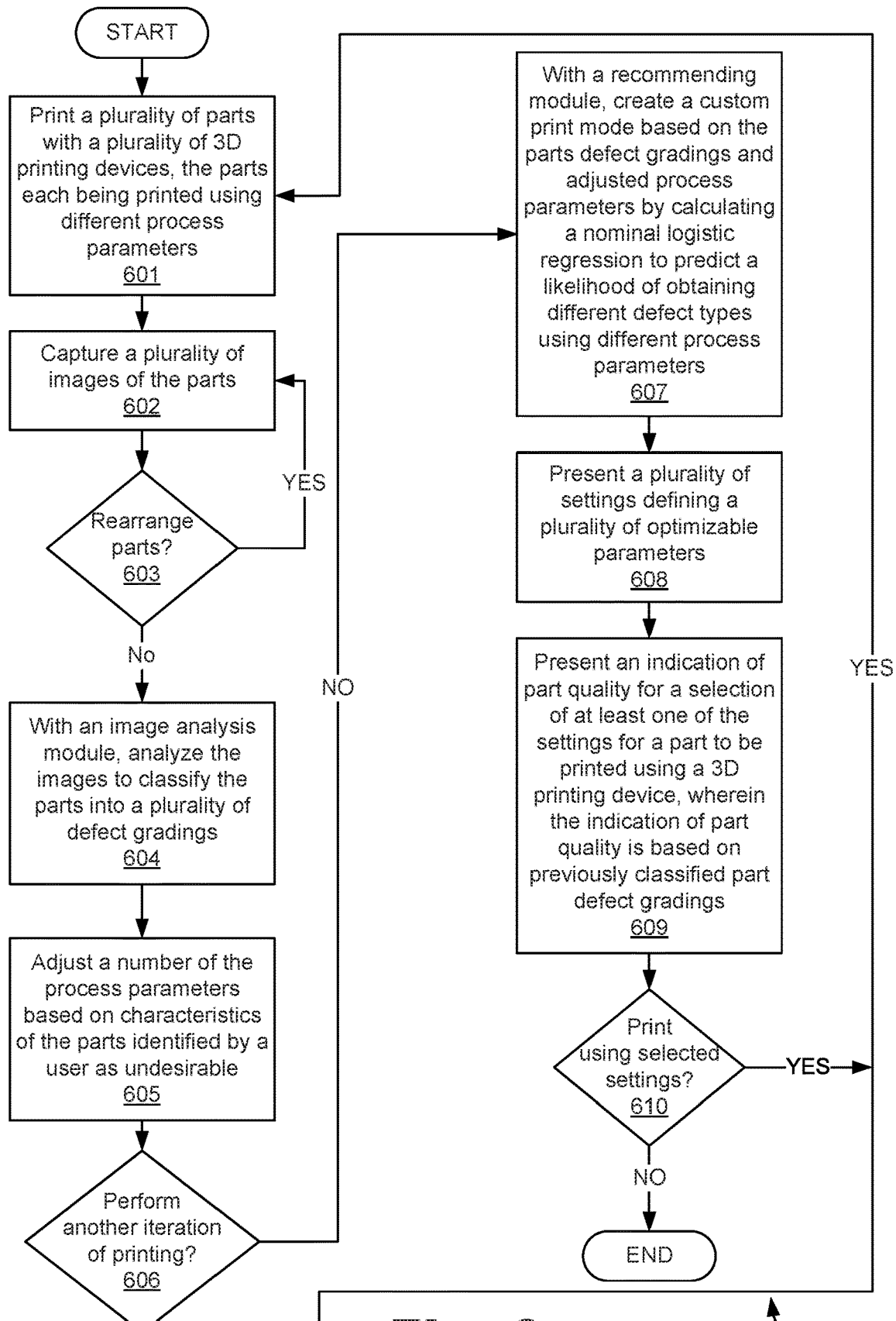
FIG. 6 is a flowchart showing a method of presenting to a user-selectable, custom print modes in a 3D printing device, according to an example of the principles described herein.

FIG. 6 is a flowchart showing a method (600) of presenting to a user-selectable, custom print modes in a 3D printing device (150), according to an example of the principles described herein. The method (600) of FIG. 6 may include printing (block 601) a plurality of parts with a plurality of 3D printing devices (150), and, with the imaging device (110), capturing (block 602) a plurality of images of the parts. The system (100) may determine if the parts should be rearranged (block 603) in order to capture different surfaces of the parts that have been printed. In response to the determination that the parts should be rearranged (block 603, determination YES), the part reorientation device (111) serves to reorient these parts. In contrast, in response to the determination that the parts should not or do not need to be rearranged (block 603, determination NO), the method (600) may proceed to block 604.

At block 604, the image analysis module may then be executed by the processor (101) to analyze (block 604) the images and classify the parts into a plurality of defect gradings. The process parameters may be adjusted (block 605) through execution of the adjustment module (117) based on characteristics of the parts identified by a user as undesirable.

The method (600) may also include determining (block 606) whether to perform another iteration of printing the parts. In response to a determination (block 606, determination YES) that another iteration of printing the parts should be performed, the method (600) may loop back to block 601, and the number of iterations (blocks 601 through 606) may be performed in this manner. In contrast, in response to a determination (block 606, determination NO) that another iteration of printing the parts should not be performed, the method (600) may proceed to block 607. The method (600) may also include, with the recommending module (118), creating (block 607) a custom print mode based on the parts defect gradings and adjusted process parameters by calculating a nominal logistic regression to predict a likelihood of obtaining different defect types using different process parameters.

The method (600) may also include presenting (block 608) a plurality of settings defining the plurality of optimizable process parameters to a user via, for example, a GUI created by the computing device (200), and presenting (block 609) an indication of part quality to the user via the GUI where the indication of part quality may be based on previously classified part defect gradings as described above in connection with FIG. 5. A determination (block 610) as to whether the user wishes to print the parts using any selected settings as presented at block 608 may be made. This may include presenting on the GUI a request from the user to accept the settings selected by the user. In response to the determination that the user does want the selected settings to be applied to a subsequent printing of the parts (block 610, determination YES), then the method (600) may loop back to block 601 for printing. In response to the determination that the user does not want the selected settings to be applied to a subsequent printing of the parts (block 610, determination NO), then the method (600) may terminate.

Figure 7:
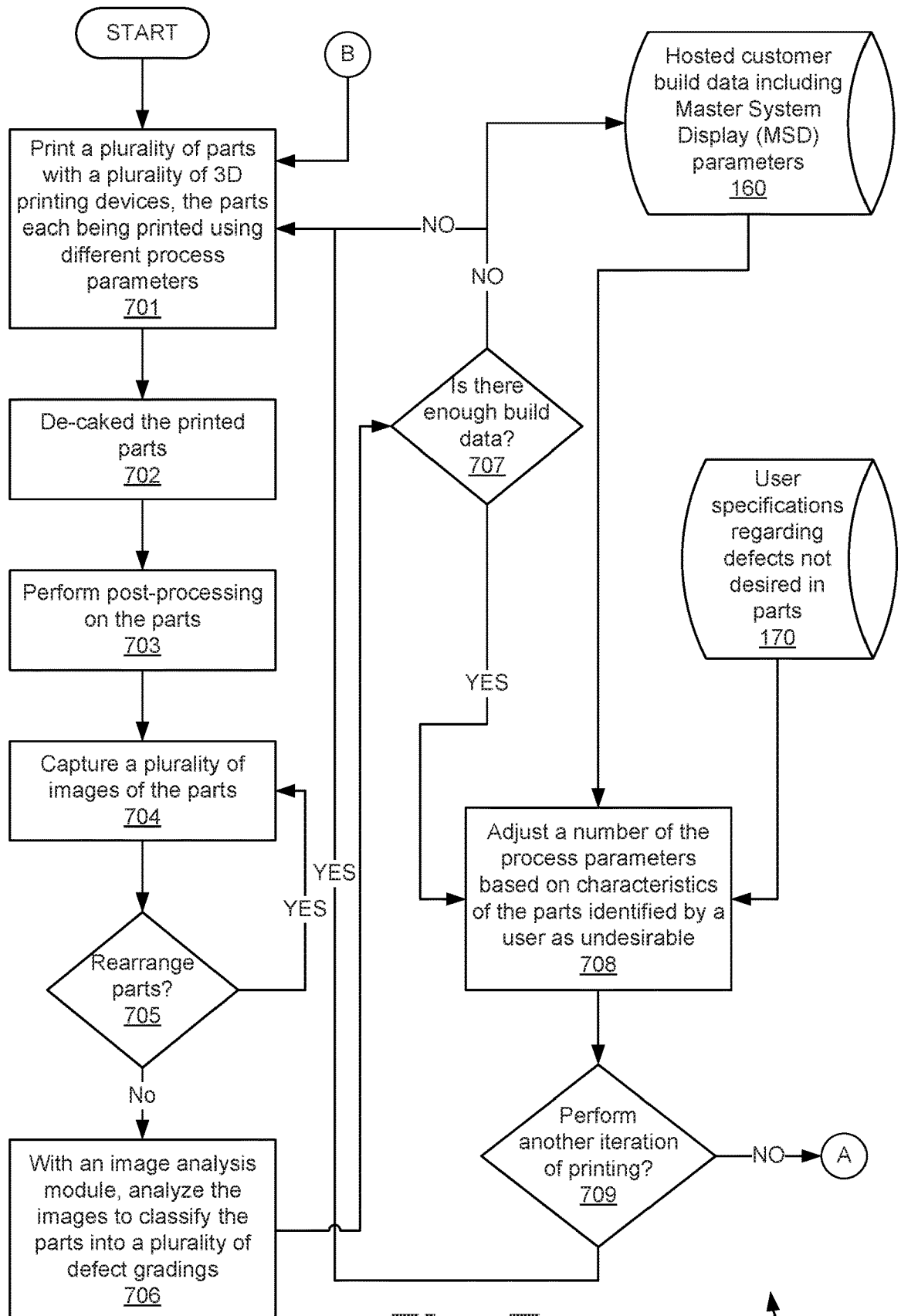
FIGS. 7 and 8 is a flowchart showing a method of creating and presenting to a user-selectable, custom print modes in a 3D printing device, according to an example of the principles described herein.
Figure 8:
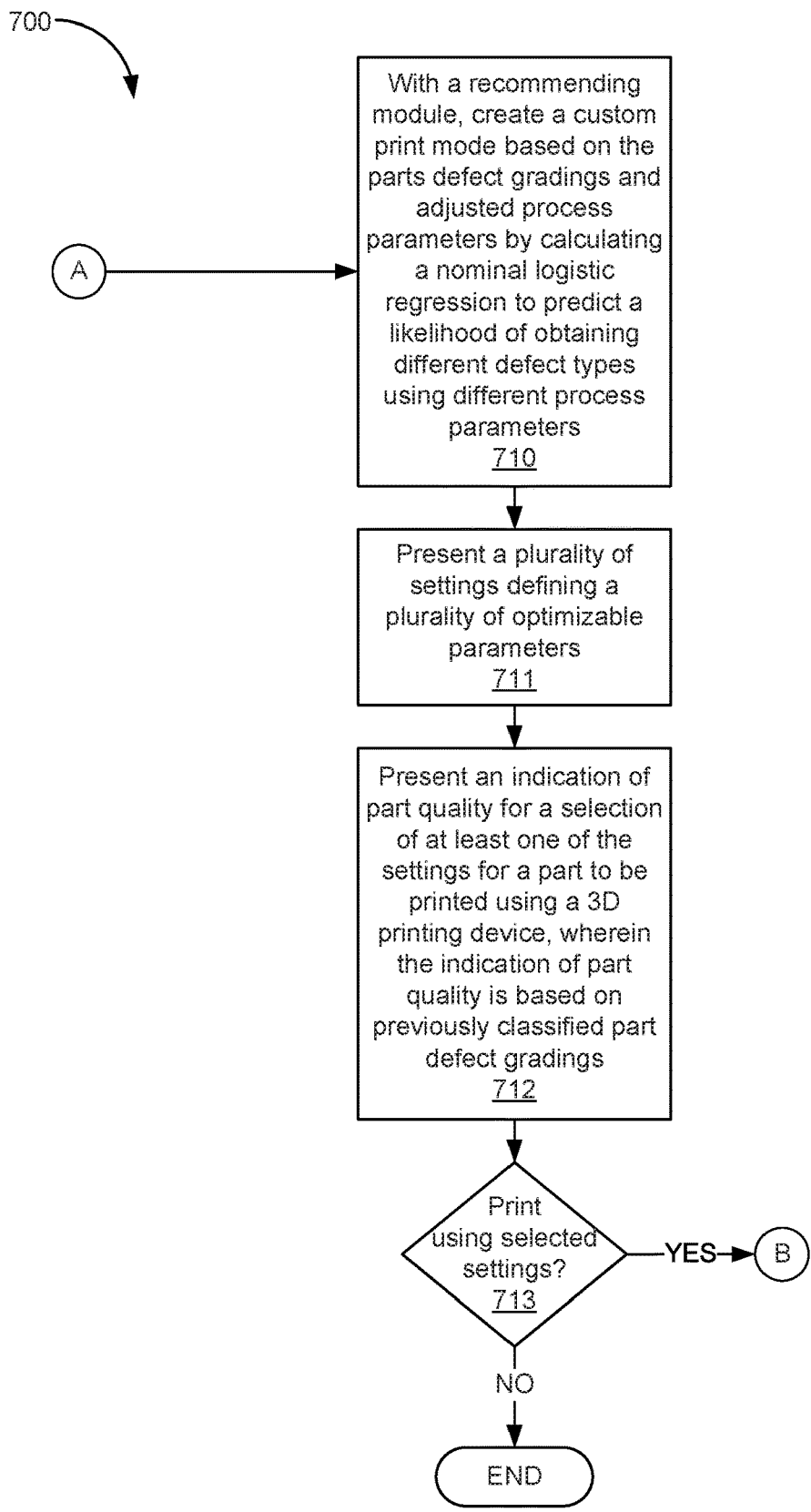

FIGS. 7 and 8 is a flowchart showing a method (700) of creating and presenting to a user-selectable, custom print modes in a 3D printing device (150), according to an example of the principles described herein. The method (700) of FIG. 7 may include printing (block 701) a plurality of parts with a plurality of 3D printing devices (150). The printed parts may be de-caked (block 702). The parts may be continually packed within the build material as the parts are built within the 3D printing device (150). De-caking (block 702) of parts built within a 3D printing device (150) includes removing build material around the parts built within the 3D printing device (150).

The method (700) may also include performing (block 703) post-processing on the parts. Post-processing of the parts may include, for example, sanding, sand blasting, milling, tumbling, varnishing, dyeing, cutting, melting, other post-printing processes, or combinations thereof.

With the imaging device (110), the method may include capturing (block 704) a plurality of images of the parts. The system (100) may determine if the parts should be rearranged (block 705) in order to capture different surfaces of the parts that have been printed. In response to the determination that the parts should be rearranged (block 705, determination YES), the part reorientation device (111) serves to reorient these parts, and the method (700) loops back to block 704 where images of the parts are continued to be captured. This loop may occur as often as the system (100) deems until a sufficient number of images are captured. In contrast, in response to the determination that the parts should not or do not need to be rearranged (block 705, determination NO), the method (700) may proceed to block 706 where the image analysis module (116) may be executed by the processor (101) to analyze (block 706) the images and classify the parts into a plurality of defect gradings.

The method (700) may then determine (block 707) if enough build data has been obtained regarding the classification of the parts into the defect gradings. If there has not been enough build data obtained (block 707, determination NO), then the method (700) may loop back to block 701 for another build of the parts to take place. This loop back to block 701 may occur as often as the system (100) deems until a sufficient amount of build data has been obtained.

In contrast, if there has been enough build data obtained (block 707, determination YES), then the method (700) may proceed to block 605 where process parameters may be adjusted (block 708) through execution of the adjustment module (117) based on characteristics of the parts identified by a user as undesirable. As indicated in FIG. 2, the hosted customer build data (160) that includes master system display (MSD) parameters and the user specifications (170) regarding defects not desired in the parts to be printed on the 3D printing device (150) may be input to block 708 as part of the data considered when adjusting (block 708) the process parameters along with the build data obtained from block 701 through 707.

At block 709, a determination (block 709) may be made as to whether another iteration of printing of the parts should be performed. In response to the system (100) determining that another iteration of printing of the parts should be performed (block 709, determination YES), the method (700) may loop back to block 701 for another build of the parts to take place and for the processes performed at block 701 through 708 to be performed. The system (100) may determine that the method (700) should loop back to block 701 (block 709, determination YES) based on whether the adjusted process parameters may change the characteristics of the parts to be printed in the next iteration in a manner that improves the parts and/or is inline with the user's specifications (170). This information may be obtained from the neural network (190) as the neural network learns how detected defects are classified by the image analysis module (116) and autonomously classify any future detected defects on the basis of what the neural network has learned as the image analysis module (116).

In response to the system (100) determining that another iteration of printing of the parts should not be performed (block 709, determination NO), the method (700) may continue to block 710 where the method (700) includes with the recommending module (118), creating (block 710) a custom print mode based on the parts defect gradings and adjusted process parameters by calculating a nominal logistic regression to predict a likelihood of obtaining different defect types using different process parameters.

The method (700) may also include presenting (block 711) a plurality of settings defining the plurality of optimizable process parameters to a user via, for example, a GUI created by the computing device (200), and presenting (block 712) an indication of part quality to the user via the GUI where the indication of part quality may be based on previously classified part defect gradings as described above in connection with FIG. 5. A determination (block 713) as to whether the user wishes to print the parts using any selected settings as presented at block 709 may be made. This may include presenting on the GUI a request from the user to accept the settings selected by the user. In response to the determination that the user does want the selected settings to be applied to a subsequent printing of the parts (block 713, determination YES), then the method (700) may loop back to block 701 for printing. In response to the determination that the user does not want the selected settings to be applied to a subsequent printing of the parts (block 713, determination NO), then the method (700) may terminate.

Aspects of the present system and method are described herein with reference to flowchart illustrations and/or block diagrams of methods, apparatus (systems) and computer program products according to examples of the principles described herein. Each block of the flowchart illustrations and block diagrams, and combinations of blocks in the flowchart illustrations and block diagrams, may be implemented by computer usable program code. The computer usable program code may be provided to a processor of a general-purpose computer, special purpose computer, or other programmable data processing apparatus to produce a machine, such that the computer usable program code, when executed via, for example, the processor (101) of the computing device (200) or other programmable data processing apparatus, implement the functions or acts specified in the flowchart and/or block diagram block or blocks. In one example, the computer usable program code may be embodied within a computer readable storage medium; the computer readable storage medium being part of the computer program product. In one example, the computer readable storage medium is a non-transitory computer readable medium.

The specification and figures describe a method of custom print mode generation in a three-dimensional (3D) printing device. The method may include printing a plurality of parts with a plurality of 3D printing devices, the parts each being printed using different process parameters, and capturing a plurality of images of the parts. The method may also include, with an image analysis module, analyzing the images to classify the parts into a plurality of defect gradings, and adjusting a number of the process parameters based on characteristics of the parts identified by a user as undesirable. The examiner may also include, with a recommending module, creating a custom print mode based on the parts defect gradings and adjusted process parameters.

The systems and methods described herein provide for the ability to customize the build of parts within a 3D printing device in order to obtain parts that meet a user's expected characteristics within the printed parts. The systems and methods provide for the ability to recommend a suite of builds to be produced on a customer unit or site based on intended ink (monochromatic or color), powder usage and defects not desired by the user or which the user cannot tolerate. The systems and methods also include a recommender for lighting conditions and lens filters for color part defects. The automated system collects the base data from the 3D printing device. This automated system acquires images from produced parts from the builds in by varying position using a built-in platen shaking mechanism or other reorienting device, and the imaging device. The image analysis module is able to identify parts and grade the parts based on defect features and attributes. The recommending module takes the gradings and process parameter data and generates a profiler so that writing systems engineers may generate a custom mode.

The preceding description has been presented to illustrate and describe examples of the principles described. This description is not intended to be exhaustive or to limit these principles to any precise form disclosed. Many modifications and variations are possible in light of the above teaching.

What is claimed is:

1. A method of custom print mode generation in a three-dimensional (3D) printing device, comprising:
   printing a plurality of parts with a plurality of 3D printing devices, the parts each being printed using different process parameters;
   capturing a plurality of images of the parts;
   with an image analysis module, analyzing the images to classify the parts into a plurality of defect gradings;
   adjusting a number of the process parameters based on characteristics of the parts identified by a user as undesirable;
   with a recommending module, creating a custom print mode based on the parts defect gradings and adjusted process parameters.

2. The method of claim 1, wherein the parts comprise at least one user-defined part and at least one reference part.

3. The method of claim 1, wherein capturing the plurality of images of the parts comprises, rearranging the parts with a robotic arm, rearranging the parts using a shaking mechanism, capturing the parts in a plurality of lighting conditions, capturing the parts in a plurality of wavelengths of light, or combinations thereof.

4. The method of claim 1, wherein the process parameters comprise fusing lamp power levels, fusing lamp scan speeds, warming lamp power levels, warming lamp scan speeds, powder temperatures, humidity levels, powder dose volumes, spreader roller rotation velocities, spreader roller transverse velocities, fusing agent density levels, cooling agent density levels, build material melting points, build material crystallization temperatures, build material conductivity, build material thermal mass values, build material thermal properties, build material densities, build material flowability, build material friction properties, build material mechanical properties, part model used, a number of layers assigned to a core of the part model used, a number of layers assigned to a mantle of the part model used, a number of layers assigned to a shell of the part model used, part post processing methods used, percentage of part expansion of an original geometry of the part, percentage of part dilation of the original geometry of the part, or combinations thereof.

5. The method of claim 1, wherein creating the custom print mode based on the adjusted process parameters comprises performing a plurality of iterations of printing the plurality of parts with the plurality of 3D printing devices, each iteration comprising different process parameters.

6. The method of claim 1, wherein capturing the plurality of images of the parts comprises capturing the images in a visible electromagnetic spectrum, an infrared electromagnetic spectrum, an ultraviolet electromagnetic spectrum, a 3D imaging device, or combinations thereof.

7. The method of claim 1, wherein creating the custom print mode based on the parts defect gradings and adjusted process parameters comprises, with the recommending module, calculating a nominal logistic regression to predict a likelihood of obtaining different defect types using different process parameters.

8. A non-transitory computer readable medium comprising computer usable program code embodied therewith, the computer usable program code to, when executed by a processor:
   present a plurality of settings defining a plurality of optimizable process parameters;
   present an indication of part quality for a selection of at least one of the settings for a part to be printed using a 3D printing device, wherein the indication of part quality is based on previously classified part defect gradings; and
   adjust a number of the process parameters based on characteristics of the parts identified by a user as undesirable.

9. The computer readable medium of claim 8, comprising:
   computer usable program code to, when executed by the processor:
   capture a plurality of images of a plurality of parts printed using a 3D printing device, the parts each being printed using different process parameters executing a design of experiments (DoE) process;
   with an image analysis module, analyze the images to classify the parts into the part defect gradings;
   adjust a number of the process parameters based on characteristics of the parts; and
   with a recommending module, create a custom print mode based on the part defect gradings and adjusted process parameters;
   wherein the DoE process comprises:
   varying the process parameters of each of the builds of each part; and
   evaluating an impact of the process parameters and the interactions of the process parameters on the parts.

10. The computer readable medium of claim 9, wherein capturing the plurality of images of the parts comprises, rearranging the parts with a robotic arm, rearranging the parts using a shaking mechanism, capturing the parts in a plurality of lighting conditions, capturing the parts in a plurality of wavelengths of light, capturing the images in a visible electromagnetic spectrum, capturing the images in an infrared electromagnetic spectrum, capturing the images in an ultraviolet electromagnetic spectrum, or combinations thereof.

11. The computer readable medium of claim 9, wherein the process parameters comprise fusing lamp power levels, fusing lamp scan speeds, warming lamp power levels, warming lamp scan speeds, powder temperatures, humidity levels, powder dose volumes, spreader roller rotation velocities, spreader roller transverse velocities, fusing agent density levels, cooling agent density levels, build material melting points, build material crystallization temperatures, build material conductivity, build material thermal mass values, build material thermal properties, build material densities, build material flowability, build material friction properties, build material mechanical properties, or combinations thereof.

12. The computer readable medium of claim 8, wherein the previously classified defect gradings are a product of an analysis performed using a neural network.

13. The computer readable medium of claim 9, wherein creating the custom print mode based on the parts defect gradings and adjusted process parameters comprises, with the recommending module, calculating a nominal logistic regression to predict a likelihood of obtaining different defect types using different process parameters.

14. A system for generating custom three-dimensional (3D) print modes, comprising:
- a design of experiments (DoE) module to instruct at least one 3D printing device to print a plurality of parts, the parts each being printed using different process parameters, wherein the DoE module:
  - varies the process parameters of each of the builds of each part; and
  - evaluates an impact of the process parameters and the interactions of the process parameters on the parts;
- an imaging device to capture a plurality of images of the plurality of parts;
- an image analysis module to classify the parts into a plurality of defect gradings;
- an adjustment module to adjust a number of the process parameters based on characteristics of the parts identified by a user as undesirable; and
- a recommending module to create a custom print mode based on the parts defect gradings and adjusted process parameters.

15. The system of claim 14, comprising a part reorientation device to reorient the parts, wherein the part reorientation device comprises a robotic arm, a shaking mechanism, or combinations thereof.

* * * * *